May 10, 1932.  G. J. GRIZEY  1,858,010
WARE STACKING MECHANISM
Filed Jan. 9, 1930  2 Sheets-Sheet 2
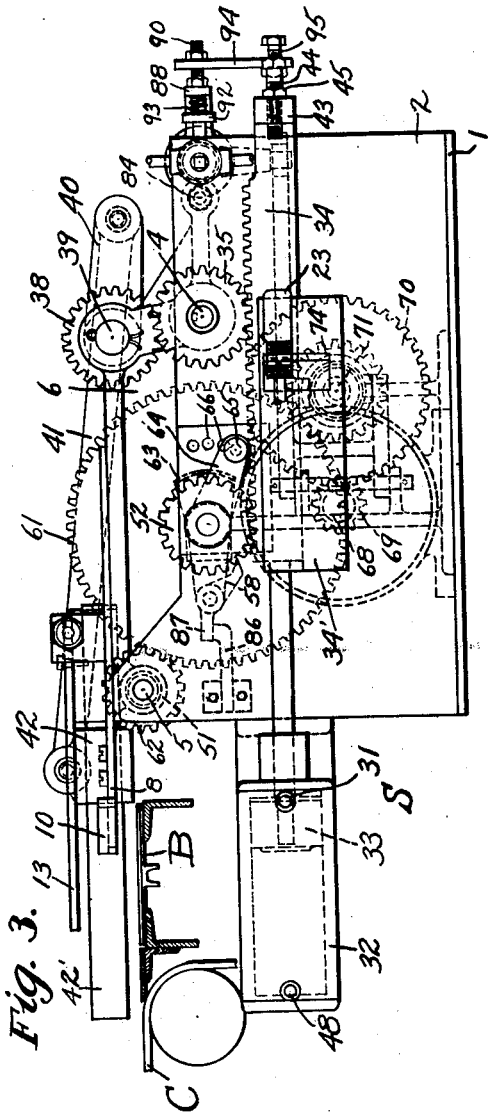
Witness:
G. A. Deling.
Inventor;
George J. Grizey
by Burm r Baslaw
Attorneys.

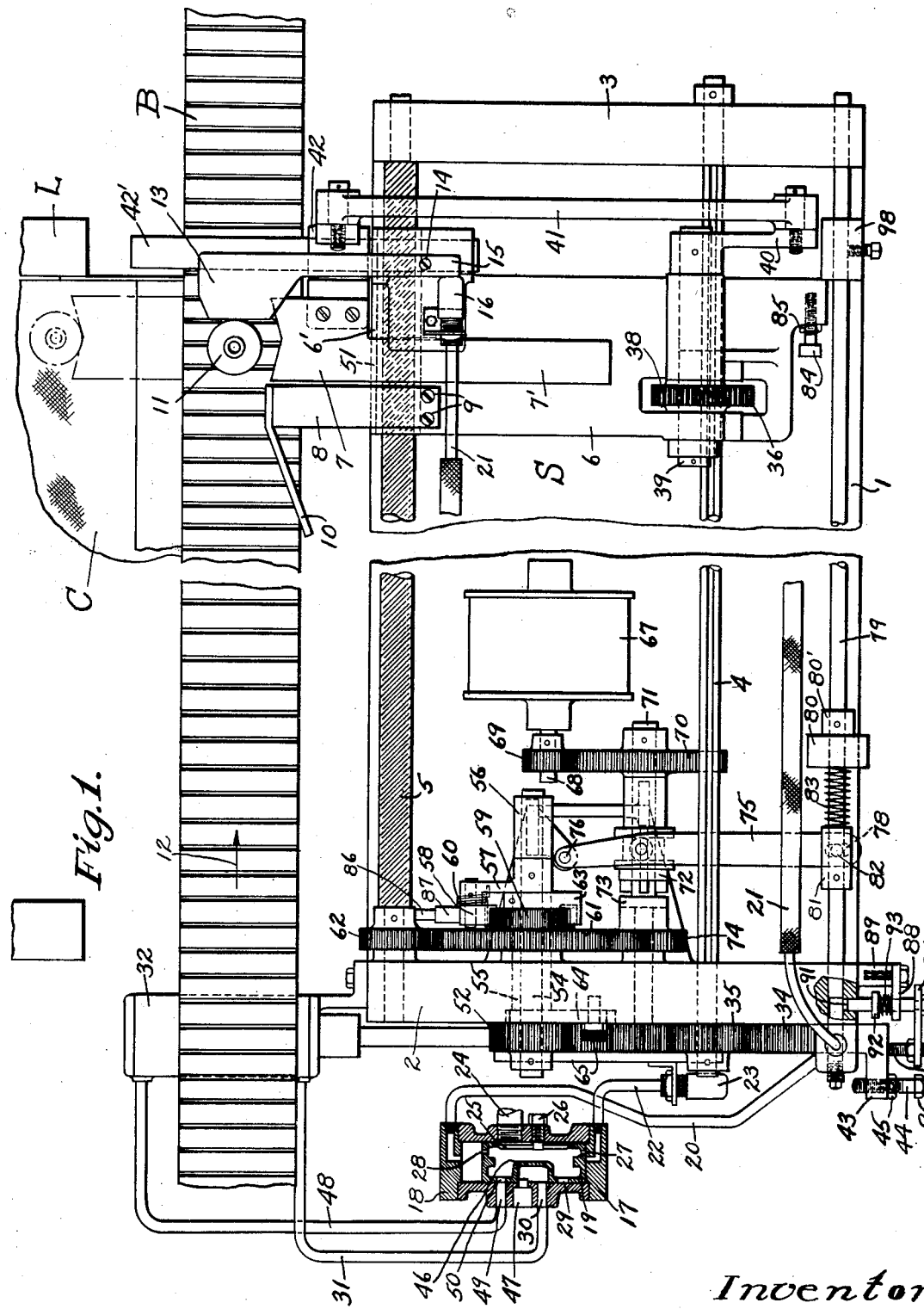

Patented May 10, 1932

1,858,010

UNITED STATES PATENT OFFICE

GEORGE J. GRIZEY, OF HARTFORD, CONNECTICUT, ASSIGNOR TO HARTFORD-EMPIRE COMPANY, OF HARTFORD, CONNECTICUT, A CORPORATION OF DELAWARE

WARE STACKING MECHANISM

Application filed January 9, 1930. Serial No. 419,498.

This invention relates to an apparatus for stacking glass articles upon a conveyor belt by which they may be carried through a leer for annealing the glass, but it is also applicable to stacking means effective for stacking any small articles upon a movable conveyor for any purpose.

In stacking articles of glassware on a leer conveyor, a common practice is to carry the articles on a conveyor from the forming machine to the leer and preferably across the front thereof and to push them from the conveyor onto the leer belt with a bar extending substantially across the leer, this bar being actuated at timed intervals or being tripped by the ware at proper times.

Ware arriving on such a conveyor may not be evenly spaced. Variations in the time the ware is set down by the forming machine, in slippage on the conveyor or from the removal of articles for inspection may cause wide variations in the spacing of the articles on the conveyor. As a result of these irregularities, the ware is irregularly spaced in the leer, widely separated at some points and jammed together at others. It is highly desirable for uniformity in annealing that the ware be spaced uniformly, and for maximum capacity of the leer, that it be spaced closely without, however, contacting with adjacent articles which may mar or check the ware. My invention, therefore, provides means whereby the ware is spaced uniformly across the leer no matter how irregularly it may arrive upon the conveyor and the spacings may be adjusted as desired in accordance with the characteristics of the ware being handled.

An object of my invention is to provide pusher mechanism of a type somewhat similar to that shown in the application of Edward H. Lorenz, Serial No. 410,295, filed November 29, 1929, but in which only one pusher mechanism is used, this pusher mechanism being moved laterally of the leer conveyor in step by step fashion and the movements preferably taking place between the stacking or pushing movements of the mechanism. I have shown for this purpose a means by which the pusher mechanism is traversed across the leer conveyor during the retractive movements of the pusher.

A further object of the invention is to provide means travelling with the pusher mechanism for actuating the pusher in response to the arrival of articles in position to be stacked.

A further object of the invention is to prevent the actuation of the automatic mechanism in response to the articles except when the pusher is fully retracted, so that each actuation of the pusher is completed before the beginning of the next movement.

A further object of the invention is to provide means for varying the lateral travel of the pusher mechanism between the stacking of succeeding articles, so that a desired number of longitudinal rows of articles may be placed on the leer conveyor, thus compensating for variations in the sizes of articles being stacked and utilizing the space on the leer conveyor to the best advantage.

A further object of the invention is to provide independent means for controlling the limits of the lateral travel of the pusher mechanism, so that articles may be stacked as near as desired to the edges of the conveyor belt.

A further object of the invention is to provide automatic means for moving the pusher mechanism back to the furthest limit of its travel after it has completed the stacking of a substantially transverse row of articles upon the leer conveyor, and before stacking the first article in the next similar row.

A further object of the invention is to insure that the reverse lateral travel of the pusher mechanism takes place only after the pusher is fully retracted, whereby positively to prevent the toppling over of articles by the lateral movement of the pusher mechanism when the pusher is in contact with the articles.

A further object of the invention is to provide a means positively to prevent movement of the pusher during the reverse travel as aforesaid.

Further objects and advantages of the present construction and of specific mechanisms used therein will become apparent from a reading of the following specification and appended claims when taken in connection with the accompanying drawings, in which:

Figure 1 is a plan view of the mechanism used in carrying out my invention, the view being shortened by breaking away the central portion thereof;

Fig. 2 is an elevation of the mechanism of my invention taken from the side shown at the bottom of Fig. 1;

Fig. 3 is an end elevation of the mechanism taken from the left-hand side of the mechanism as illustrated in Fig. 1;

Fig. 4 is a detailed elevation showing the means for causing the step by step lateral movements of the pusher mechanism; and Fig. 5 is a detailed central section of one of the bleeder valves.

In general I have illustrated my invention as embodied in a stacker S in association with a glassware buck or conveyor B and a glass annealing leer L having a conveyor belt C adapted to carry the ware through the leer. The buck B is of any suitable type adapted to receive ware to be conveyed to the leer L and is mounted to move transversely of the direction of movement of the leer belt C and across the entrance end of the leer. I do not wish to be limited, however, to an arrangement in which the buck B is necessarily arranged across the entrance end of the leer as any buck, which is usable to convey articles of glassware toward the leer might be used with suitable modification of the invention and within the purview thereof.

The stacker mechanism S embodies a single pusher mechanism and a tripping arm, the pusher blade being mounted for horizontal reciprocation transversely of the buck B and longitudinally of the leer belt. It is also within the intended scope of my invention to construct a pusher mechanism, which may be moved laterally across the leer belt upon a fixed pivot rather than limiting it to a translatory movement at right angles to the direction of movement of the leer belt, and claims which are not specifically limited to the construction illustrated are to be read with this in mind. The pusher mechanism is actuated in response to the arrival of a glass article on the buck B in position to be pushed into the leer, the article there contacting with the tripping mechanism, which serves to actuate the pusher and pushes the article into the leer. Upon retractive movement of the pusher, the pusher mechanism is moved transversely of the leer belt, a distance to bring the pusher opposite the next contiguous row of articles, so that when the succeeding article on the buck B contacts with the tripping member and is pushed on to the leer belt by the pusher, it will be placed in the next contiguous longitudinal row of articles on the leer belt. This operation will be repeated until an entire substantially transverse row of articles has been placed on the belt, at which time automatic means will be set in motion to return the pusher mechanism to the other end of its path of travel, so that the next article stacked will be placed at the opposite end of the next similar row of articles. For this purpose a separate means is provided for moving the pusher mechanism in a reverse direction, this means being effective to move the mechanism at a speed greater than the speed of movement of the buck B.

I have provided suitable means for automatically initiating the reverse movement when the pusher mechanism reaches a predetermined point in its stacking travel, which point may be adjusted as desired and also a suitable adjustable means for limiting the reverse movement of the pusher mechanism. I have also provided safety means which positively prevent the automatic actuation of the pusher until the preceding movement both toward and away from the leer belt and the accompanying lateral movement have been completed, and which positively prevent the reverse movement until the pusher has been fully retracted from its position across the leer conveyor and also other mechanism for positively preventing the actuation of the pusher mechanism by the tripping means during the reverse movement.

Referring now particularly to the drawings, the stacking mechanism S comprises a base 1, having upstanding bracket portions 2 and 3 at its ends for supporting the several mechanisms. Supported in the end brackets 2 and 3 are rotatable shafts 4 and 5, later to be described in detail, upon which is mounted a pusher mechanism including the carriage 6, which supports the pusher blade 7 mounted for reciprocatory sliding movement thereon in a direction toward and away from the leer belt C, and as shown in the drawings, parallel to the direction of movement thereof. A bracket 8 is secured by screws 9, or in other suitable manner, to the supporting carriage 6 and carries at its outer end a deflector 10 located over a portion of the buck B and serving to deflect articles, which may be at one side of the buck toward the center thereof to bring them into alignment with the pusher blade 7.

As an article 11 is carried toward the leer by the buck B, which moves in the direction of the arrow 12 (Fig. 1), to a position in alignment with the pusher blade 7, it contacts with a tripping lever 13, which is pivotally mounted on the carriage 6 at 14 and which is provided with a tail portion 15 at the opposite side of its fulcrum from the buck B. Movement of the article 11 under the influence of the buck B serves to swing the lever 13 in a clockwise direction about its fulcrum 14 pushing the movable cap of the bleeder valve 16 to the left, as seen in Fig. 1. The details of the interior construction of the valve are shown in Fig. 5 and will be described hereinafter.

Referring now to Fig. 1, I have provided a means, the movement of which is initiated by actuation of the valve 16 for actuating the several parts of the entire mechanism. This means includes a control valve generally indicated at 17. This valve comprises a casing 18 having a hollow slide 19 therein. The rearward end of the casing 18 communicates by pipes 20 and 21 with the bleeder valve 16 and the forward end thereof similarly communicates through pipe 22 with the bleeder valve 23. Constant pressure air is supplied from the pipe 24 to the interior of the casing 18 and inside the hollow slide 19 into which it passes through a slot 25 in the slide. A suitable guide screw 26 may be inserted through the side of the casing 18 and have its end received in the slot 25 for preventing the rotation of the hollow slide 19 within the casing 18. The interior of the slide 19 communicates by small passages 27 and 28 with the forward and rearward ends of the casing 18 respectively. Thus, when the bleeder valve 16 is opened by the impacts of a bottle or other glass article 11 on the trip lever 13 and the bleeder valve 23 is closed, pressure will be exhausted from the rearward end of the casing 18 through the pipes 20 and 21 and pressure will build up in the forward end of the casing, which will move the hollow slide 19 rearwardly or upwardly as seen in Fig. 1. This movement will bring the port 29 of the hollow slide 19 into registry with the port 30 in the casing 18 and pressure will pass from the interior of the hollow slide 19, through ports 29 and 30, and pipe 31 to the lower end of the cylinder 32, as seen in Fig. 1. This will cause a movement of the piston 33 in the cylinder 32 to the left, as seen in Fig. 3, which will move the rack 34 to the left (Fig. 3). The rack 34 is supported on suitable bracket members 34' and engages a suitable pinion 35 to rotate the pinion and the shaft 4 to which it is fixed, in a clockwise direction. The carriage 6 is provided with a pinion 36 splined on the shaft 4 and received between suitable bearings portions 37 of a bracket depending from the carriage 6. A second pinion 38 is rigidly mounted on a suitable shaft 39 journaled in the carriage 6 and engages the pinion 36. The shaft 39 is provided at its right-hand end, as seen in Fig. 1, with a crank 40 rigidly secured thereto and connected at its outer end by a link 41 with a suitable bracket 42 rigidly secured to the pusher blade 7. The bracket 42 is arranged for sliding movement on the guide rod 42', which is rigidly mounted in the carriage 6 and extends in a direction parallel to the path of movement of the leer belt C. The pusher blade is further guided and rotation about the axis of the shaft 42' is prevented by the engagement of one side of the tail portion 7' of the blade 7 in a suitable slot formed in a lug 6' of the carriage 6. Thus, clockwise movement of the shaft 4 brought about through movement of the rack 34 and gear 35, as seen in Fig. 3, will produce counter clockwise movement of the shaft 39 through the gears 36 and 38, which will move the pusher blade 7 toward the leer belt C. The ratios of the gears are such that the entire stroke of the rack 34 is sufficient to rotate the shaft 39 through approximately 180°. By this construction, it is to be noted that the movement of the pusher will include a gradual acceleration and a gradual deceleration due to the terminal positions of the crank 40, which, if the rod 4 were given a movement of constant angular velocity, would be substantially harmonic. Allowing for some period of acceleration and deceleration of the piston 33 within the cylinder 32, the movement of the pusher 7 will still be substantially harmonic. Also, the means just described for operating the pusher is effective in any lateral position of the carriage 6, due to the fact that the pinion 36 is splined on the shaft 4.

Reverse movement of the rack 34 will be effective through the mechanism just described to retract the pusher blade 7. This movement is effected as follows: The rack 34 is provided with an L-shaped bracket 43 at its outer end in which is mounted a suitable adjustable abutment screw 44, which may be secured in adjusted position by a nut 45. Upon movement of the rack 34 to the left, as seen in Fig. 3, the abutment screw will contact with the cap of a bleeder valve 23 and vent the pipe 22 and the forward end of the casing 18 as seen in Fig. 1. At this time the pusher blade 7 has been moved forwardly toward the leer, so that the lever 13 has been returned to its normal position and the bleeder valve 16 has been closed both by the spring within the valve as seen in Fig. 5. The hollow slide member 19 will then be moved forwardly to the position seen in Fig. 1 due to the building up of pressure behind the slide, which will connect the port 30 with the exhaust port 47 through the cup shaped portion 46, and will connect the pipe 48 leading to the port 49 of the casing 18 through the port 50 with the interior of the hollow slide 19, thus admitting pressure to the head or left-hand end of the cylinder 32 and moving the rack 34 to the right, all as seen in Fig. 3. This movement resets the pusher blade 7 for the next article, as hereinbefore described. The parts then come to rest until again actuated by contact of the next succeeding article with the trip lever 13.

In order to prevent the actuation of the tripping lever 13 before the pusher blade 7 is fully retracted, the blade is formed with an elongate tail piece 7', which during the time the blade is in any position other than that shown in Fig. 1, is extended across the conveyor B and in line between the next succeeding article thereon and the lever 13. Thus the pusher blade 7 must be fully retracted to the position shown in Fig. 1 and the lateral travel of the carriage 6 completed in a manner hereinafter to be described prior to the actuation of the lever 13 by the next succeeding article. This positively insures that the articles will be placed in predetermined longitudinal rows on the leer conveyor C.

For moving the carriage 6 and pusher mechanism carried thereby laterally, I provide the shaft 5 with a right-hand screw thread, which is threaded in a suitable depending bracket 51 of the carriage 6. Means are provided for rotating the shaft 5 and thus for traversing the carriage 6 transversely of the leer belt. This means comprises a pinion 52 (Figs. 1 and 3) also engaged by the teeth of the rack 34 and mounted rigidly upon a central shaft 54 which is received within a sleeve 55 in turn journaled in the bracket member 2, and at the outer end, the shaft 54 is journaled in a suitable bearing 56. To the shaft 54 is secured a crank arm 57 carrying at its outer end a pawl 58, which is urged toward the ratchet 59 by a suitable torsion spring 60 (Figs. 1 and 4). The ratchet 59 is loosely mounted on the sleeve 55 and is secured to a large gear wheel 61, which also meshes with a gear 62 secured to the shaft 5. Thus, the movement of the rack 34 to the left, as seen in Fig. 3, which is effective as above described to project the pusher blade 7 forwardly to push an article into the leer is also effective to rotate the pinion 52 in a clockwise direction (Fig. 3), this rotation, however, causes no movement of screw shaft 5 as the pawl 58 slides idly over the teeth of the ratchet 59. Upon movement of the rack 34 in the opposite direction and during the retractive movement of the pusher blade 7, the pinion 52 will be rotated in a counterclockwise direction, which will rotate the arm 57 and pawl 58 in the same direction and will be effective to cause the pawl 58 to engage the teeth of and rotate the ratchet 59. Movement will then be transmitted through the ratchet 59, gear 61 and gear 62 to the shaft 5, which is held against endwise movement, and which thus moves the carriage 6 and the pusher mechanism mounted thereon to the left, as seen in Fig. 1.

I provide means for variably determining the amount of movement imparted to the screw 5 and thus the amount of lateral traverse of the carriage 6 in response to a full stroke of the rack 34, such means including a means for preventing the engagement of the pawl 58 and ratchet 59 until a desired time. For this purpose I have mounted a shield 63, (Figs. 1, 3 and 4) on the hollow sleeve 55, the shield having a curvature substantially concentric with the ratchet 59 and being so located that upon movement of the rack 34 to the left, as seen in Fig. 3, and the idle stroke of the pawl over the teeth of the ratchet, the pawl will ride up upon the shield 63 and out of engagement with the ratchet teeth. Upon reverse movement of the rack 34, the pawl will not engage with the teeth of the ratchet until it rides off the shield 63. This point may be varied by varying the angular position of the shield 63. For this purpose the sleeve 55 may be adjusted angularly by means of an arm 64 secured thereto and having a pin 65 extending through the end thereof and adapted to be projected into any one of a plurality of apertures 66 formed in the side of the bracket 2. By this means I am enabled to vary the arc of engagement between the pawl 58 and ratchet 59 and thus the amount of lateral movement of the pusher mechanism for each stroke of the rack, which in effect varies the lateral distance between the longitudinal rows in which the articles are stacked on the leer belt.

I provide a means for moving the carriage 6 and the pusher mechanism carrier thereby in a reverse direction laterally of the leer belt after its active stacking travel, comprising a source of mechanical power shown in the present instance by a continuously operating motor 67 having a shaft 68 to which is secured a pinion 69, which meshes with a gear 70 rigidly mounted on a shaft 71. Splined to the shaft 71 is an axially movable clutch component 72, which is cooperable with an axially fixed component 73 secured to a gear 74, and both loosely mounted for rotation on the shaft 71, the gear 74 meshing with the gear 61. The direction of rotation of the motor 67 is such that when the clutch components 72 and 73 are brought into engagement by the axial movement of the component 72, power from the motor will be transmitted through the gears 69 and 70, shaft 71, clutch components 72 and 73, gears 74, 61 and 62 to the shaft 5 for rotating it in a counterclockwise direction, as seen in Fig. 3, and moving the carriage 6 and pusher mechanism carried thereby to the right, as seen in Fig. 1.

I provide automatic actuating means for the clutch, specifically for moving the clutch element 72 axially of the shaft 71, such means including a lever 75 pivoted at 76 to a suitable fixed part of the apparatus and straddling the clutch component 72, suitable rollers 76' (Fig. 2) being secured to the lever and being received within an annular groove 77 of the clutch component 72. The end of the lever 75 remote from its fulcrum 76 is provided with an elongate opening 78 in which is received a pin 82 secured in a collar 81 rigidly mounted on a slide shaft 79, which shaft is received in suitable bearings in the bracket members 2 and 3. Loosely mounted upon the slide shaft 79 is a slide member 80, which is separated from the collar 81 by a compression spring 83. Movement of the slide member 80 an excessive distance to the right as seen in Fig. 1 is prevented by a collar 80′ pinned to the shaft 79. The carriage 6 is provided with an abutment member 84, which may be adjustably threaded therein and secured in adjusted position by a lock nut 85. Upon movement of the carriage 6 to the left, as seen in Fig. 1, the abutment member 84 contacts with the slide member 80 and puts the spring 83 under compression or loads it, so that when the shaft 79 is released to permit its axial movement, in a manner hereinafter to be described, the clutch components 72 and 73 will be brought into operative engagement by the expansion of the spring 83.

In order, however, to prevent too early engagement of the clutch members 72 and 73 or an engagement during the time the pawl 58 is in engagement with the teeth of the ratchet 59, I have provided a suitable safety mechanism by which axial movement of the shaft 79 is prevented until the rack 34 reaches the limit of its return travel, as seen in Fig. 1, at which time the pusher 7 will be fully retracted from the leer conveyor. Such means includes a stop member 86, which is suitably secured to the bracket 2 and is positioned in alignment with the tail piece 87 of the pawl 58, so that upon the completion of the movement of the rack 34 to the right, as seen in Fig. 3, the tail piece 87 of the pawl 58 will contact with the stop 86, thus forcing the pawl 58 out of engagement with the ratchet 59 and freeing the ratchet for movement in the opposite direction when the clutch members 72 and 73 are engaged. To insure the clutch member 72 and 73 staying apart until the rack 34 has reached the limit of its stroke, as in the position shown in Figs. 1 and 3, so as to release the pawl 58 from the ratchet 59 and to fully retract the pusher blade 7, I provide a means which is normally interposed in the path of axial movement of the shaft 79 and which is automatically withdrawn from its normal position to permit such movement at the proper time. This means includes a bracket 88 secured to a boss 89 on the bracket member 2 and being provided with an aperture in which a pin 90 is mounted for axial movement, the inner end 91 of the pin 90 being located in the path of the shaft 79 except when the rack 34 is in the position shown in Figs. 1 and 3. Means are provided for urging the pin 90 constantly into the safety position including a collar 92 secured to the pin 90 and a compression spring 93 sleeved on the pin and extending between the collar 92 and the bracket 88. The pin 90 is provided with an arm 94 having an adjustable abutment screw 95 at its end in alignment with the end of the rack 34, so that as the rack 34 is moved to the right, as seen in Fig. 3, it engages the abutment screw 95 and withdraws the pin 90 from its position in alignment with the shaft 79 against the compression of the spring 93.

Assuming now that the last bottle to be stacked in a transverse row contacts with the member 13 and actuates the cylinder 32 to move the rack 34 and project the bottle onto the leer belt C, the retractive movement of the pusher blade 7 will be accompanied by a further lateral movement of the carriage 6, which will load up the spring 83 by contact between the abutment 84 and the slide 80. No further action will take place, however, until the rack 34 completes its movement causing the pawl 58 to be moved out of contact with the ratchet 59 by the engagement of the tail piece 87 of the pawl with the stop 86 and until the last movement of the rack moves the pin 90 out of alignment with the rod 79. Thereafter the compression of the spring 83 will force the clutch members 72 and 73 together and the motor 67 will be effective through the mechanism described and to rotate the shaft 5 in a counterclockwise direction and move the carriage 6 to the right, as seen in Fig. 1. The speed of the motor and the ratio of the gears is such that the rate of the reverse lateral movement of the carriage 6 is greater than the rate of movement of articles on the buck B, so that during the return transverse movement of the carriage 6 and under ordinary circumstances, no article can contact with the trip member 13 and thus be pushed into the leer into contact with other articles on the leer belt.

As a further safety measure, however, I have provided a means positively to prevent the actuation of the cylinder 32 during the reverse lateral movement of the carriage 6 as above described, which might cause articles to be brought into contact with each other on the leer belt and also might cause breakage of the parts of the stacking apparatus due to the engagement of the pawl 58 with the ratchet 59 when they are moving in relatively opposite directions. This means includes an automatic valve controlling communication between pipes 21 and 20, which lead from the bleeder valve 16 to the controlling valve 17. The shaft 79 (Figs. 1 and 2) is utilized as a valve member to cut off communication between these pipes. When the shaft 79 is moved to the left (as seen in Figs. 1 and 2) to a point in which the clutch members 72 and 83 are engaged, communication is cut off between pipes 20 and 21 by the interposition of the shaft 79 between ports 96 and 97 with which these pipes communicate respectively.

I also provide means for adjustably limiting the reverse travel of the carriage 6 or movement thereof to the right, as seen in Fig. 1, the means also serving to restore the parts to their original position for the stacking travel by disengaging the clutch members 72 and 73. This means comprises a collar 98 adjustably secured to the rod 79 and adapted to be engaged by a portion of the carriage 6 as it nears the end of its reverse movement. This engagement moves the rod 79 to the right, disengaging the clutch member 72 and 73 and permitting the spring 93 to move the pin 90 into alignment with the rod 79 as soon as a rack 34 is moved in stacking an article.

Thus, it will be seen that both ends of the lateral travel of the carriage 6 are independently adjustable, whereby the distance between the sidemost longitudinal rows of articles on the leer belt and the edges of the belt may be varied as desired, and also that the amount of lateral travel between each actuation of the pusher is likewise adjustable so that articles may be stacked on the leer belt in a desired number of longitudinal rows. Furthermore, various safety devices are provided insuring the full automatic operation of the apparatus and positively preventing improper operation.

The only detail which has not thus far been described is the interior construction of the bleeder valves 16 and 23, which are identical and which are shown in detail in Fig. 5. Each of these valves comprises a nipple member 99 which may be threaded onto the pipe to which the valves are attached and which have threaded or otherwise secured thereon body members 100 having cavities 101 therein and passages 102 in axial alignment with the cavities. Suitable valve members 103 are employed normally to close the passages 102 and are urged toward such position by the springs 104. Cap members 105 are fitted over the body members 100 and are secured against displacement by the screws 106 passing through the slots 107 in the caps 105 and threaded into the body portions 100, shafts 108 passing axially through the upper end of the body portion 100 and abutting at their opposite ends against the cap members 105 and the valves 103. When the caps are moved axially of the bodies, the stems of shafts 108 unseat the valves 103 and permit pressure, which has accumulated in the pipes to which the bleeder valves are attached to pass through the cavities 101 and passages 102 to the diametrical passages 109, which, when the caps are pushed down, are in alignment with openings 110 of the caps. Suitable vent openings 111 are formed in the upper ends of the caps to prevent the building up of pressure in their ends which might retard the action of the bleeder valves.

While I have shown and described but one embodiment of my apparatus it will be understood that various of the mechanisms herein shown and described may be used in other connections and various other combinations and sub-combinations of the ideas herein disclosed may be useful elsewhere. I do not wish to be limited, therefore, except by the scope of the appended claims, which are to be construed as broad as the prior art permits.

I claim:

1. In combination, a conveyor on which glassware is to be stacked in longitudinal rows, a second conveyor carrying articles of glassware toward the first conveyor, means for transferring said articles from the second to the first conveyor, comprising a pusher mechanism, means responsive to the movement of the glassware for actuating the pusher, and means for moving said pusher mechanism into alignment with another of said longitudinal rows of ware on the first conveyor prior to the next succeeding actuation of said pusher.

2. In combination, a conveyor on which articles of glassware are to be stacked in longitudinal rows, a second conveyor for carrying articles of glassware toward the first named conveyor, and means for transferring said articles individually to said first conveyor, comprising a pusher mechanism including a pusher mounted for sliding movement toward and away from said first conveyor, a fluid pressure cylinder, a rack connected to be actuated by said cylinder, a gear cooperating with said rack and mechanically connected to impart positive sliding movement to the pusher to move it in both directions, a second gear also receiving power from said rack, a pawl and ratchet associated with the last named gear, and means actuated by said pawl and ratchet for traversing said pusher mechanism laterally of said first conveyor, the pawl and ratchet being so arranged as to effect the lateral traverse of the pusher mechanism during the retractive movements of the pusher.

3. In combination, a conveyor on which articles of glassware are to be stacked in longitudinal rows, a second conveyor for carrying articles of glassware toward the first named conveyor, and means for transferring said articles individually to said first conveyor comprising a pusher mechanism including a pusher, means for reciprocating the pusher toward and from said first conveyor to transfer articles one at a time from the second conveyor and stack them onto said first conveyor, means for moving said pusher mechanism laterally of said first conveyor to stack articles in a plurality of longitudinal rows on said first conveyor, and means for varying the lateral travel of the pusher mechanism.

4. In combination, a conveyor on which articles of glassware are to be stacked in longitudinal rows, a second conveyor for carrying articles of glassware toward the first named conveyor, and means for transferring said articles individually to said first conveyor comprising a pusher mechanism including a pusher, means for reciprocating the pusher toward and from said first conveyor to transfer articles one at a time from the second conveyor and stack them onto said first conveyor, means for moving said pusher mechanism laterally of said first conveyor to stack articles in a plurality of longitudinal rows on said first conveyor, the last named means including a ratchet operatively operatively connected to cause lateral movements of the pusher mechanism, a pawl associated with said ratchet, means for actuating said pawl, and means for variably determining the arc through which the pawl and ratchet are in cooperative engagement.

5. The combination with a conveyor on which glass articles stacked, of a second conveyor for carrying glass articles toward the first named conveyor, and means for transferring said articles individually to said first conveyor, comprising a pusher mechanism including a pusher, means for reciprocating the pusher toward and away from said first conveyor to stack articles thereupon, means for moving said mechanism laterally of said first conveyor in one direction to stack succeeding articles in different longitudinal rows thereon, means to move said mechanism in a reverse direction a distance equal to its full lateral travel between the stacking of succeeding articles after the completion of the full travel in the first direction for stacking articles on said first conveyor, and means to prevent the reverse lateral travel of the pusher mechanism until the pusher is completely withdrawn from said first conveyor.

6. The combination with a conveyor on which glass articles are to be stacked, of a second conveyor for carrying glass articles toward the first named conveyor, and means for transferring said articles individually to said first conveyor, comprising a pusher mechanism including a pusher, means for reciprocating the pusher toward and away from said first conveyor to stack articles thereupon, a screw rotatably mounted but held against endwise movement and threaded in said pusher mechanism, means operable in response to retractive movements of the pusher for imparting intermittent movements to said screw to move the pusher mechanism in one direction between the stacking of succeeding articles, a continuously operating source of mechanical power, a clutch interposed between said source of power and said screw, means operable in response to the movement of said pusher mechanism to the end of its travel in said direction for engaging said clutch to rotate said screw in the opposite direction, and means operable in response to the movement of said pusher mechanism to the other extreme limit of its lateral travel to disengage said clutch preparatory to the stacking of the next substantially transverse row of articles on said first conveyor.

7. The combination with a conveyor on which glass articles are to be stacked, of a second conveyor for carrying glass articles toward the first named conveyor, and means for transferring said articles individually to said first conveyor, comprising a pusher mechanism including a pusher, means for reciprocating the pusher toward and away from said first conveyor to stack articles thereupon, a screw rotatably mounted but secured against endwise movement and threaded in said pusher mechanism for moving it laterally, means operable during the retractive movements of the pusher for imparting intermittent movements to said screw to move the pusher mechanism progressively in one direction between the stacking of succeeding articles, a continuously operating source of mechanism power, a clutch interposed between said source of power and said screw, a lever operatively connected to said clutch, means to move said lever to engage and disengage said power from said screw including an adjustable abutment on said pusher mechanism for actuating said lever to engage said clutch at the termination of its progressive movement of stacking a row of articles on said first conveyor, a slide rod operatively connected to said lever, and an adjustable abutment on said slide rod adapted to be engaged by said pusher mechanism at the termination of its reverse lateral movement.

8. The combination with a conveyor on which glass articles are to be stacked, of a second conveyor for carrying glass articles toward the first named conveyor, and means for transferring said articles individually to said first conveyor, comprising a pusher mechanism including a pusher, means for reciprocating the pusher toward and away from said first conveyor to stack articles thereupon, means for moving said mechanism laterally of said first conveyor in one direction to stack succeeding articles in different longitudinal rows thereon, means to move said mechanism in a reverse direction a distance equal to its full lateral travel between the stacking of succeeding articles, and means to prevent the reciprocation of said pusher during such reverse movement.

9. The combination with a conveyor on which glass articles are to be stacked, of a second conveyor for carrying glass articles toward the first named conveyor, and means for transferring said articles to said first conveyor from said second conveyor, comprising a pusher mechanism including a pusher, means responsive to the movement of individual glass articles for actuating the pusher to move said articles respectively onto said first conveyor, means for traversing said pusher mechanism laterally of said first conveyor in one direction during retractive movements of the pusher, means for moving said mechanism in a reverse direction a distance equal to its full lateral travel between the stacking of succeeding articles after the completion of the full travel in the first direction, and means for rendering inoperative the automatic mechanism responsive to contact of the individual articles for stacking them during such reverse movement.

10. The combination with a conveyor on which glass articles are to be stacked, of a second conveyor for carrying glass articles toward the first named conveyor, and means for transferring said articles individually to said first conveyor, comprising a pusher mechanism including a pusher, means for reciprocating the pusher toward and away from said first conveyor to stack articles thereupon, means for moving said mechanism laterally of said first conveyor in one direction to stack succeeding articles in different longitudinal rows thereon, automatic means to move said mechanism in a reverse direction a distance equal to its full lateral travel between the stacking of succeeding articles, means for varying one of the limits of the lateral travel of said pusher mechanism as desired, and means for varying the lateral travel of said pusher mechanism between the stacking of succeeding articles.

11. The combination with a conveyor on which glass articles are to be stacked, of a second conveyor for carrying glass articles toward the first named conveyor, and means for transferring said articles individually to said first conveyor, comprising a pusher mechanism including a pusher, means for reciprocating the pusher toward and away from said first conveyor to stack articles thereupon, means for moving said mechanism laterally to said first conveyor in one direction to stack succeeding articles in different longitudinal rows thereon, means to move said mechanism in a reverse direction a distance equal to the full lateral travel between the stacking of succeeding articles, means to independently vary both limits of the lateral travel of said pusher mechanism as desired, and means for varying the lateral travel of said pusher mechanism between the stacking of succeeding articles.

12. The combination with a conveyor on which glassware is to be stacked in longitudinal rows, of a second conveyor carrying articles of glassware toward the first named conveyor, means for transferring said articles from said second conveyor to said first conveyor comprising a pusher mechanism including a pusher, means responsive to the movement of individual articles for actuating the pusher to stack articles one by one on said first conveyor and to move said pusher mechanism laterally step by step on retractive movements of the pusher to cause succeeding articles to be stacked in different longitudinal rows on said first conveyor, and automatic means for moving said pusher mechanism a distance equal to its entire lateral travel and in a reverse direction after the stacking of the last article of a substantially transverse row on said first conveyor.

13. The combination with a conveyor on which glassware is to be stacked in longitudinal rows, of a second conveyor carrying articles of glassware toward the first named conveyor, means for transferring said articles from said second conveyor to said first conveyor, comprising a pusher mechanism including a pusher, means responsive to the movement of individual articles for actuating the pusher to stack articles one by one on said first conveyor and to move said pusher mechanism laterally step by step on retractive movements of the pusher, whereby succeeding articles are stacked in different longitudinal rows on said first conveyor, automatic means for moving said pusher mechanism a distance equal to its entire lateral travel and in a reverse direction after the stacking of the last article of a substantially transverse row on said first conveyor, means for preventing such reverse movement until the pusher has completed its retractive movement after stacking the last article of a substantially transverse row, and means rendering inoperative the article contact means which causes the actuation of the pusher during such reverse lateral movement of said pusher mechanism.

14. The combination with a conveyor on which glass articles are to be stacked, of a second conveyor arranged for continuous movement in a direction at right angles with the direction of movement of the first named conveyor for carrying glass articles toward said first conveyor, and means for individually transferring said articles from said second conveyor to said first conveyor, comprising a pusher mechanism including a pusher, means responsive to the movement of individual articles of glassware on said second conveyor for actuating the pusher to push said articles one by one onto said first conveyor and to cause step by step lateral movement of said pusher mechanism upon retractive movement of said pusher, means operable in responsive to movement of said pusher mechanism in stacking the last article of a substantially transverse row for reversing the lateral movement of the pusher mechanism and for moving said pusher mechanism in such reverse direction a distance equal to its entire lateral travel, means for preventing such reverse lateral movement of the pusher mechanism until the completion of the retractive movement of said pusher for stacking the last article of said transverse row, means for preventing reciprocatory movement of said pusher during such reverse movement, means for independently adjusting the limits of lateral travel of said pusher mechanism, and means for varying the extent of lateral travel of said pusher mechanism between the stacking of succeeding articles, whereby articles may be stacked in a desired number of longitudinal rows on said first conveyor, the distance between such rows may be varied at will, and the distance between the sidemost rows and the edges of said first conveyor may also be independently varied.

15. In transfer apparatus, and in combination with approaching and receding conveyors traveling in courses at right angles one to the other, a carriage movable in the direction of the course of the approaching conveyor and equipped with an arm extensible in the direction of the course of the receding conveyor, means borne by the carriage for extending the said arm, and an automatic control of the said arm-extending means, such control being subject to the advance of a piece of work on the said approaching conveyor.

16. In transfer apparatus, and in combination with approaching and receding conveyors traveling in courses at right angles one to the other, a carriage movable in the direction of the course of the approaching conveyor and equipped with an arm extensible in the direction of the course of the receding conveyor, and means operated on the advance of a piece of work on the approaching conveyor for automatically extending said arm.

17. In transfer apparatus, and in combination with approaching and receding conveyors traveling in courses at right angles one to the other, a carriage movable in a direction parallel to the course of the approaching conveyor and equipped with an arm extensible in the direction of the course of the receding conveyor, means for effecting the extension and regression of said arm, and means operative by a piece of work advancing on the approaching conveyor for rendering the arm-extending means effective.

18. In transfer apparatus, and in combination with approaching and receding conveyors traveling in courses at right angles one to the other, a carriage movable in a direction parallel to the course of the approaching conveyor and equipped with an arm extensible and retractible in the direction of the course of the receding conveyor, means for effecting the extension and retraction of the said arm, means rendered operative by the advance of a piece of work on the approaching conveyor for rendering effective said arm-extending means, and means rendered operative by the extension of said arm for effecting the retracting of said arm.

Signed at Hartford, Connecticut, this 4th day of January, 1930.

GEORGE J. GRIZEY.